United States Patent [19]

Gram

[11] 4,010,720
[45] Mar. 8, 1977

[54] ACCELERATOR PRESSURE CONTROL MECHANISM

[75] Inventor: Reginald H. Gram, West Hill, Canada

[73] Assignee: The Raymond Lee Organization, Inc., New York, N.Y.; a part interest

[22] Filed: Apr. 14, 1975

[21] Appl. No.: 564,096

[52] U.S. Cl. .......................... 123/103 R; 123/103 E
[51] Int. Cl.[2] .......................................... F02D 11/08
[58] Field of Search ........... 123/103 R, 103 E, 108, 123/103 C; 180/108

[56] References Cited

UNITED STATES PATENTS

| | | | |
|---|---|---|---|
| 2,517,501 | 8/1950 | Mennesson | 123/103 E |
| 2,585,814 | 2/1952 | McDonald | 123/103 R |
| 2,825,418 | 3/1958 | Kershman | 123/103 E |
| 2,853,985 | 9/1958 | Landrum | 123/103 R |

Primary Examiner—Wendell E. Burns
Assistant Examiner—William Randolph
Attorney, Agent, or Firm—Howard I. Podell

[57] ABSTRACT

An accelerator control linkage for the engine of a vehicle which maintains a maximum vacuum in the intake manifold of the engine. The linkage of the accelerator normally allows the throttle to open only when a predetermined vacuum is present in the manifold. This is accomplished by a bellows connected to the intake manifold so that the force of the bellows on the rod is proportional to the degree of vacuum in the manifold, with a tension spring, mounted to the rod to oppose the force of the bellows, in use, to accelerate by opening the throttle when intake vacuum is diminished, requires more force on the part of the foot of the driver, with less pedal force required under conditions of high vacuum to encourage driving the engine under most economical conditions.

3 Claims, 3 Drawing Figures

TO VACUUM MANIFOLD

ACCELERATOR PRESSURE CONTROL MECHANISM

SUMMARY OF THE INVENTION

My invention is an accelerator control linkage for the engine of a vehicle which maintains a maximum vacuum in the intake manifold of the engine.

The linkage of the accelerator normally allows the throttle to open only when a predetermined vacuum is present in the manifold.

This is accomplished by a bellows connected to the intake manifold so that the force of the bellows on the rod is proportional to the degree of vacuum in the manifold, with a tension spring, mounted to the rod to oppose the force of the bellows, in use, to accelerate by opening the throttle when intake vacuum is diminished, requires more force on the part of the foot of the driver, with less pedal force required under conditions of high vacuum to encourage driving the engine under most economical conditions.

BRIEF DESCRIPTION OF THE DRAWINGS:

The objects and features of the invention may be understood with reference to the following detailed description of an illustrative embodiment of the invention, taken together with the accompanying drawings in which.

Figure 1:
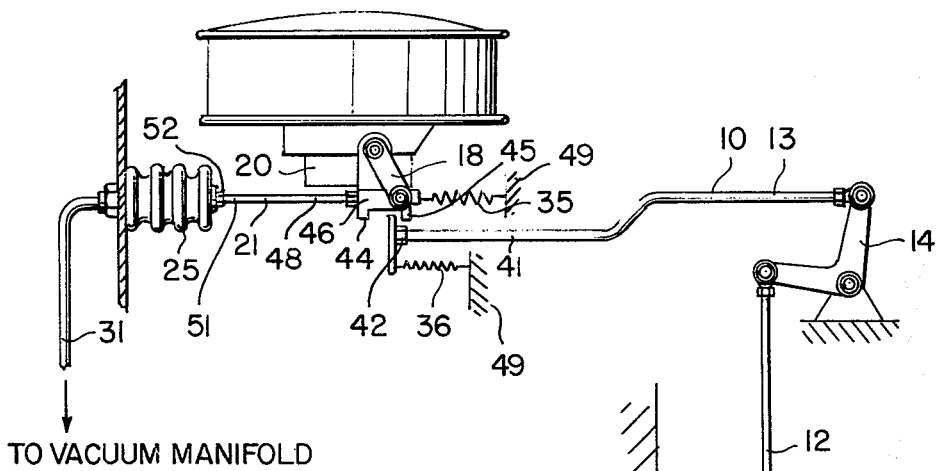
FIG. 1 is a schematic diagram of the invention.
Figure 3:
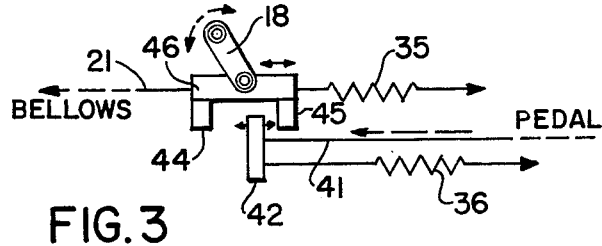
FIG. 3 is a schematic drawing of the linkage.

DESCRIPTION OF THE PREFERRED EMBODIMENT:

Turning now descriptively to the drawings, in which similar reference characters denote similar elements throughout the several views, FIG. 1 illustrates the throttle linkage 10 of a vehicle engine (not shown), The accelerator pedal 11 is fastened to throttle rods 12 and 13, which are joined by bell crank 14, so that movement of a foot 15 on pedal 11, with rotation of pedal 11 causes consequent linear movement of slidable rod 13. The free end 41 of slidable rod 13 is fitted with a threaded bracket 42 which rides freely between stops 44 and 45 on a bracket 46 fitted to one end 48 of a slidable rod 21, with bracket 46 pivotably fixed to pivotable throttle control lever 18 of carburetor 20.

Bracket 42 of throttle rod is fitted with a tension spring 36 fastened to engine frame 49 so as to bias bracket 42 against stop 45 of bracket 46. Bracket 46 is fitted with a tension spring 35 fastened to engine frame 49 so as to bias bracket 46 in the direction of moving throttle control lever 18 to the idle position of carburetor 20. Springs 35 and 36 are formed of a size such that throttle control lever 18 will move to the idle position when no other forces are imposed on slidable rod 21 by attached bellows unit 25 or on slidable rod 13 by foot pressure on pedal 11.

The end 51 of slidable rod 21 is fastened to end 52 of a hollow bellows unit 25 connected to the engine intake vacuum manifold by tubing 31, so that a decrease of air pressure inside of bellows unit 25 causes tension force in rod 21 to counteract the bias of spring 35 in the direction to move lever 18 away from the idle position of carburetor 20.

Figure 2:
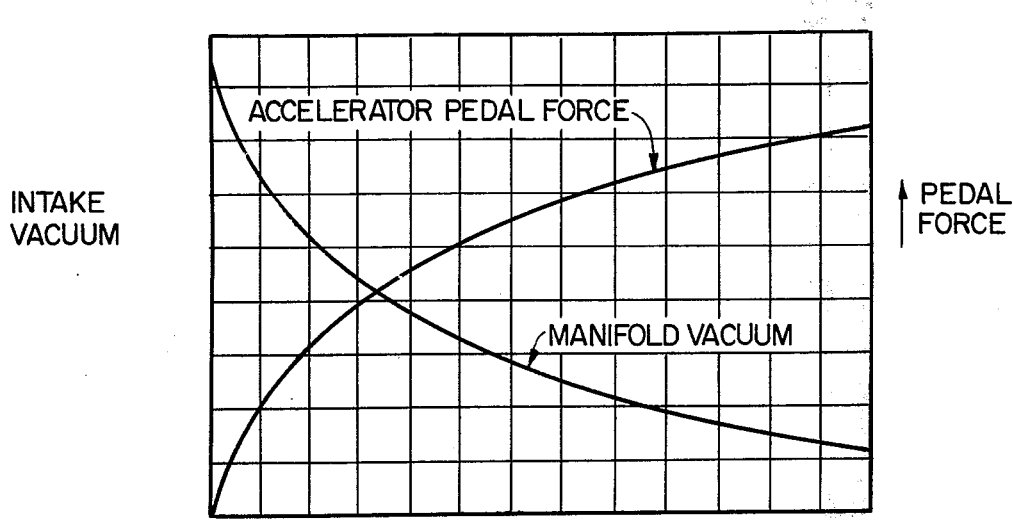
FIG. 2 is a charge indicating the relation of pedal force to the intake manifold vacuum of an engine on which the invention is installed.

Foot pressure on pedal 11 causes slidable rod 13 to move attached bracket 42 against stop 44 of bracket 46 with continued foot pressure causing bracket 46 and attached throttle control lever 18 to move in the direction resulting in greater fuel flow into carburetor 20. The force required by the foot 15 on pedal 11 to move bracket 46 in this fashion is dependent upon the extent of vacuum in bellows 25 such that greater force is required by foot 15 to cause fuel to flow under conditions of low vacuum in the engine manifold, while less force is required under conditions of high engine intake vacuum, as shown in FIG. 2.

Tension spring 36 applies return bias to slidable rod 13, permitting spring 35 to move the throttle control lever 18 to the idle position, when no foot pressure is applied on pedal 11, despite a high vacuum condition in bellows 25.

The invention encourages the operator of the vehicle in which the engine is installed to feed fuel into the engine under economical conditions of high intake manifold vacuum and discourages the wasteful use of fuel under conditions of low intake manifold vacuum, since greater foot pressure is required in the latter case against the accelerator pedal 11.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A throttle linkage for the carburetor of an internal combustion engine that encourages the operation of the engine at a high vacuum condition in the engine intake manifold, said linkage comprising
    a carburetor, the throttle valve linkage of which is biased by first spring means to the idle position of the throttle valve,
    an accelerator pedal linkage biased by second spring means to the idle position of the accelerator pedal, and
    a bellows unit powered by the suction furnished from a tube joined to the intake manifold of said carburetor,
    said pedal linkage and said bellows unit each fitted with means to engage the throttle valve linkage in parallel configuration,
    said first spring means and said second spring means being of a magnitude to generate a total force together that is greater than the force generated by the bellows unit with
    said bellows unit linked to the said throttle valve so as to apply a force to the throttle valve in the direction opposed to the force applied by each of said spring means and in the direction of the force applied to the throttle linkage by the pedal linkage when the accelerator pedal is moved away from the idle position, such that
    an increase of suction in the bellows unit and in the intake manifold reduces the force required to hold the accelerator pedal linkage away from the idle position.

2. The combination as recited in claim 1 in which the bellows unit is directly linked to the carburetor throttle valve linkage.

3. The combination as recited in claim 1 in which a section of the accelerator pedal linkage rides freely between a pair of stops fixed to the throttle valve linkage with the said section of the accelerator pedal linkage bearing alternately against one of said stops when the accelerator pedal linkage is moved in one of two reciprocal directions to engage said throttle valve linkage.

* * * * *